(12) United States Patent
Keller

(10) Patent No.: US 10,654,426 B1
(45) Date of Patent: May 19, 2020

(54) TOILET APPARATUS

(71) Applicant: Justin Keller, Prospect Park, PA (US)

(72) Inventor: Justin Keller, Prospect Park, PA (US)

( * ) Notice: Subject to any disclaimer, the term of this patent is extended or adjusted under 35 U.S.C. 154(b) by 0 days.

(21) Appl. No.: 16/210,494

(22) Filed: Dec. 5, 2018

(51) Int. Cl.
| | | |
|---|---|---|
| *B60R 15/04* | (2006.01) | |
| *B60R 11/00* | (2006.01) | |
| *E03D 3/10* | (2006.01) | |
| *E03D 5/01* | (2006.01) | |
| *E04H 1/12* | (2006.01) | |

(52) U.S. Cl.
CPC ............... *B60R 15/04* (2013.01); *E03D 3/10* (2013.01); *E03D 5/01* (2013.01); *B60R 2011/004* (2013.01); *E04H 1/1216* (2013.01)

(58) Field of Classification Search
CPC .. B60R 15/04; E03D 3/10; E03D 5/01; E04H 1/1216
USPC ............................................................ 4/321
See application file for complete search history.

(56) References Cited

U.S. PATENT DOCUMENTS

| | | | |
|---|---|---|---|
| 192,113 A | 6/1877 | Cooper | |
| 3,594,825 A * | 7/1971 | Reid | B60R 15/00 4/663 |
| 3,871,399 A * | 3/1975 | Watson | B60R 15/00 137/899 |
| 4,454,613 A * | 6/1984 | Palmer | B60R 15/00 296/171 |
| 4,785,483 A * | 11/1988 | Wise | A47K 11/04 296/65.07 |
| 6,023,792 A | 2/2000 | Croucher | |
| 9,126,548 B1 * | 9/2015 | Alneainni | B60R 15/04 |

* cited by examiner

*Primary Examiner* — Huyen D Le

(57) ABSTRACT

The present invention relates to a toilet apparatus deployable in a vehicle. The apparatus comprises a commode disposed in a boot of the vehicle; a waste collection tank provided in the vehicle and in fluid communication with the commode, wherein the waste collection tank is supported on a chassis of the vehicle underneath the boot of the vehicle; a privacy enclosure configured around the commode; a wash basin provided operatively behind the commode in the vehicle, wherein the wash basin is in fluid communication with the waste collection tank; a pump in fluid communication with the wash basin and the water tank and configured to pump water from the water tank into the wash basin; and a curtain arrangement for covering a rear window of the vehicle, thereby providing the user with privacy.

9 Claims, 3 Drawing Sheets

TOILET APPARATUS

BACKGROUND OF THE INVENTION

1. Field of the Invention

The present disclosure relates to field of toilets. In particular, the present invention relates to a toilet apparatus deployable in vehicles.

2. Description of the Related Art

Toilets are one of the most basic needs of human beings. However, while travelling, many a times the travelers are denied of decent toilets as most of the travelers are not really comfortable with using public restrooms due to the sheer lack of hygiene. This is not desired.

Several designs for portable toilets have been designed in the past. None of them, however, are known to be specifically designed to for being installed in vehicles in a manner that all the basic needs of the toilet such as a commode, a wash basin, a private enclosure for the user, and so on, as required in a toilet, are deployed within the vehicle.

Applicant believes that a related reference corresponds to U.S. Pat. No. 6,023,792 filed by RODNEY K. CROUCHER, CHARLES F. ADAMSON, and ALAN MAXWELL. The Croucher reference discloses a portable toilet, for attachment to a vehicle trailer hitch, which comprises a toilet seat pivotally attached to a frame. However, the Croucher reference a toilet apparatus configured for being installed in vehicles in a manner that all the basic needs of the toilet such as a commode, a wash basin, a private enclosure for the user, and so on, as required in a toilet, are deployed within the vehicle.

Another related application is U.S. Patent Publication No. 20030192113 filed by EDWARD UNRUH. The Unruh reference discloses a portable toilet has a support stein which may be inserted into a trailer hitch. However, the Unruh reference a toilet apparatus configured for being installed in vehicles in a manner that all the basic needs of the toilet such as a commode, a wash basin, a private enclosure for the user, and so on, as required in a toilet, are deployed within the vehicle.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a toilet apparatus that is deployable on a vehicle such as a car, pickup truck, or a truck.

It is yet another object of the present invention to provide a toilet apparatus deployable on a vehicle in a manner that all the basic needs of the toilet such as a commode, a wash basin, a private enclosure for the user, and so on, as required in a toilet, are deployed within the vehicle.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
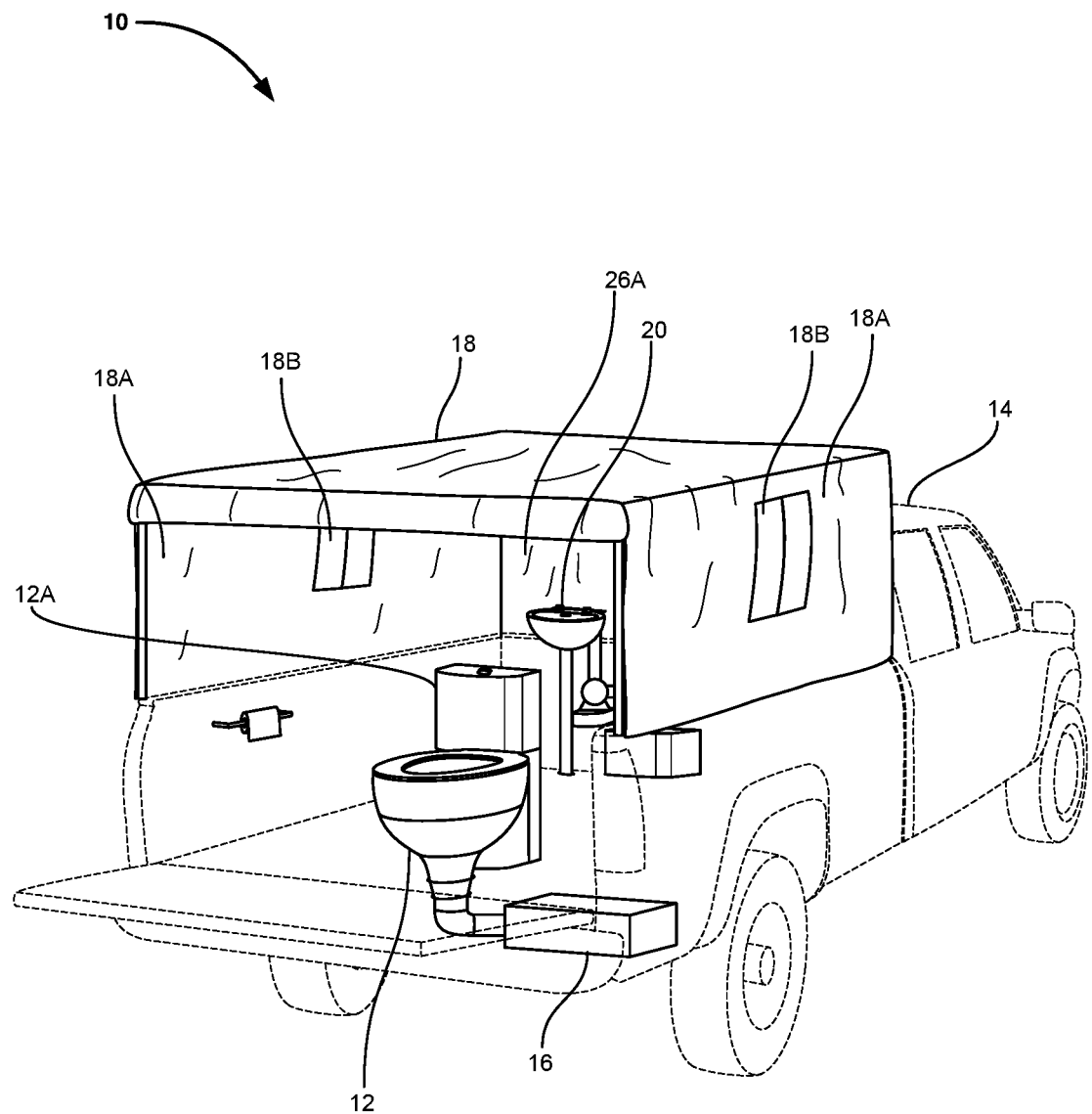
FIG. 1 illustrates an isometric view a toilet apparatus 10 deployed on a vehicle 14, in accordance with an embodiment of the present invention, wherein the toilet apparatus 10 comprises a commode 12 disposed in a vehicle 14, a waste collection tank 16 that is in fluid communication with the commode 12, and a privacy enclosure 18 configured around the commode 12.
Figure 2:
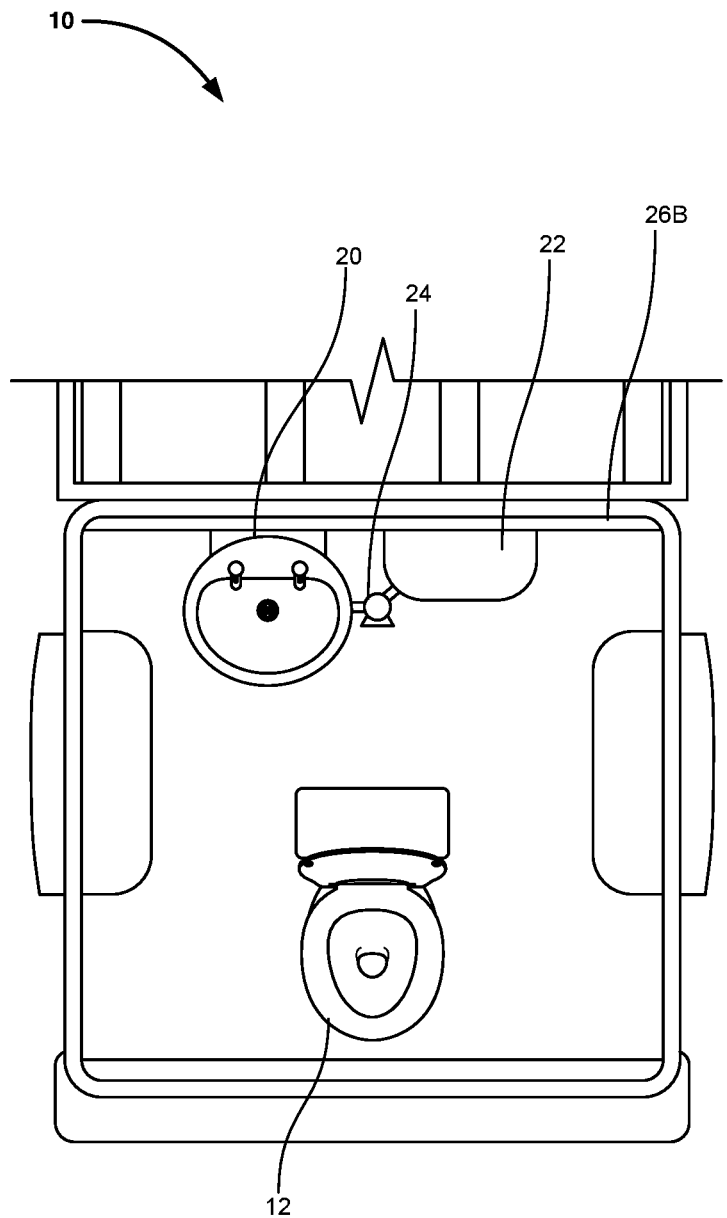
FIG. 2 illustrates a top view of the toilet apparatus 10, in accordance with an embodiment of the present invention, wherein the toilet apparatus 10 is deployed in a boot of the vehicle 14.
Figure 3:
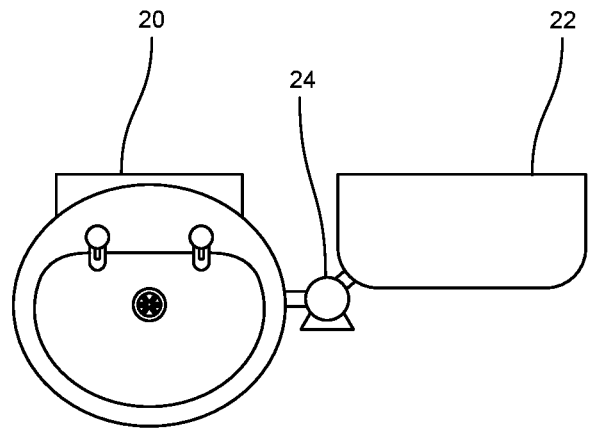
FIG. 3 illustrates a top view of a wash basin 20 of the toilet apparatus 10, wherein the wash basin 20 is in fluid communication with a water tank 22, in accordance with an embodiment of the present invention.
Figure 4:
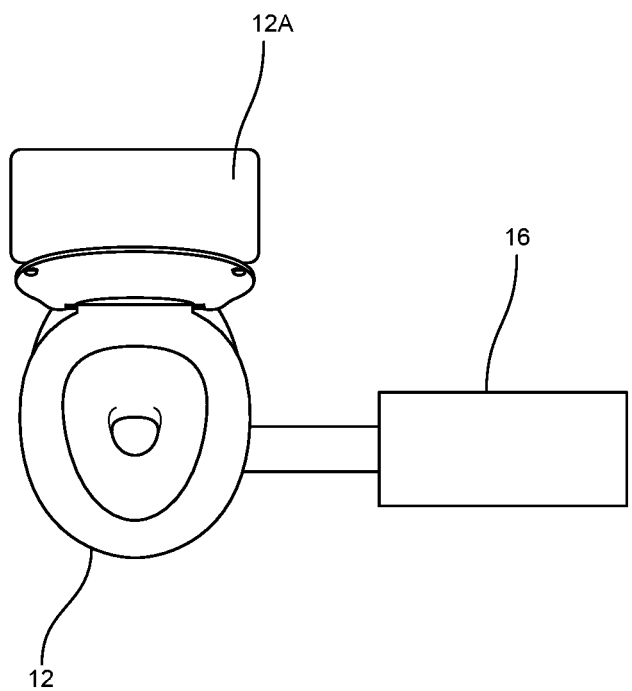
FIG. 4 illustrates a top view of the commode 12 used in the toilet apparatus 10, wherein the commode 12 is in fluid communication with a waste collection tank 16, in accordance with an embodiment of the present invention.

Referring now to FIG. 1 thru FIG. 4, where the present invention is generally referred to with numeral 10, it can be observed that a toilet apparatus 10 (hereinafter referred to as apparatus 10), in accordance with an embodiment of the present invention, comprises a commode 12 disposed in a vehicle 14, a waste collection tank 16 that is in fluid communication with the commode 12, and a privacy enclosure 18 configured around the commode 12.

The apparatus 10 comprises the commode 12. The commode 12 is disposed in a boot of the vehicle 14. The vehicle 14, in accordance with the present embodiment, is a pickup truck. However, the vehicle 14 is not limited to being a pickup truck. The vehicle 14 can be any vehicle from a group consisting of a car, a truck, a pickup truck, and the like. The apparatus 10 further comprises a flush tank 12A. The flush tank 12A is configured to contain water therewithin for flushing the commode 12 as per the application requirement.

The apparatus 10 further comprises a privacy enclosure 18 configured around the commode 12. More specifically, the privacy enclosure 18 is configured on the boot of the vehicle 14, and is defined by walls 18A. The walls 18A, in accordance with one embodiment, contain a plurality of windows 18B. The windows 18B, in accordance with one embodiment, can be tinted for giving the user the privacy needed. Alternatively, curtains can be provided over the windows 18B for giving the user the privacy needed.

The apparatus 10 further comprises the waste collection tank 16. The waste collection tank 16 is supported on a chassis of the vehicle 14. More specifically, the waste collection tank 16 is disposed underneath the boot of the vehicle 14, in accordance with the instant embodiment. The waste collection tank 16 is in fluid communication with the commode 12 for receiving the waste and the flush water from the commode 12.

The apparatus 10 further comprises a wash basin 20. The wash basin 20 is provided operatively behind the commode 12. The wash basin 20 can be used by the user for washing hands subsequent to the usage of the commode 12. Alternatively, the user can just use the wash basin 20 to wash their face and get refreshed.

The apparatus 10 further comprises a water tank 22. The water tank 22 contains the water required for flushing the commode 12 as well as for use in the wash basin 20. The water tank 22 is disposed adjacent to the wash basin 22. Ducting can be provided for facilitating the fluid communication of the water tank 22 with the wash basin 20 and the flush tank 12A. Furthermore, the wash basin 20 is also in fluid communication with the waste collection tank 16.

The apparatus 10 further comprises a pump 24 that is disposed functionally between the water tank 22 and the wash basin 20. The pump 24 is configured to pump the water into the wash basin 20, as per the application requirements. The pump 24 can also be configured to supply water to the flush tank 12A.

The apparatus 10 further comprises a curtain arrangement 26. The curtain arrangement 26 includes a curtain 26A and a curtain rod 26B. The curtain arrangement 26 is provided for covering the rear window of the vehicle 14 so that the user of the apparatus 10 has the required privacy and cannot be looked at by the driver of the vehicle 14, while the user is using the apparatus 10.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A toilet apparatus deployable in a vehicle, the apparatus comprising:
   a. a commode disposed in a boot of the vehicle;
   b. a waste collection tank provided in fluid communication with the commode, a connector piece attaching said waste collection tank and said commode, said connector piece extending beneath and away from said commode, said connector piece extending towards a lateral side of said vehicle;
   c. a privacy enclosure arranged around the commode, said privacy enclosure being mounted atop of said vehicle, said privacy enclosure extending upwardly from boot sidewalls, said privacy enclosure extending about an entire perimeter of the boot;
   d. a wash basin provided operatively behind the commode, said commode facing away from said wash basin;
   e. a curtain arrangement and a curtain rod, said curtain arrangement mounted to said curtain rod, said curtain arrangement entirely covering a rear window of the vehicle, said curtain arrangement and said curtain rod extending an entire width of the boot of the vehicle; and
   f. at least two windows mounted on said privacy enclosure, said at least two windows being directly opposite of each other.

2. The apparatus according to claim 1, further including a water tank supplying water to the wash basin.

3. The apparatus according to claim 1, further including a pump, the pump being in fluid communication with the wash basin and the water tank and configured to pump water from the water tank into the wash basin.

4. The apparatus according to claim 1, wherein the waste collection tank is supported on a chassis of the vehicle underneath the boot of the vehicle.

5. The apparatus according to claim 1, wherein the wash basin is in fluid communication with the waste collection tank.

6. The apparatus according to claim 1, wherein said at least two windows are tinted.

7. The apparatus according to claim 1, wherein said privacy enclosure includes sidewalls, said sidewalls each having an equal height, said privacy enclosure having an open configuration and a closed configuration, said open configuration achieved when at least one of said sidewalls is raised, creating at least one entirely open face of the privacy enclosure.

8. The apparatus according to claim 1, wherein one of said sidewalls is rolled up to achieve said open configuration.

9. The apparatus of according to claim 1, wherein a flush tank is mounted adjacently to said commode, said flush tank extending from said boot and above of said commode.

* * * * *